Dec. 2, 1952   A. H. MIDGLEY   2,620,450
SYNCHRONOUS ELECTRIC MOTOR
Filed Dec. 7, 1949
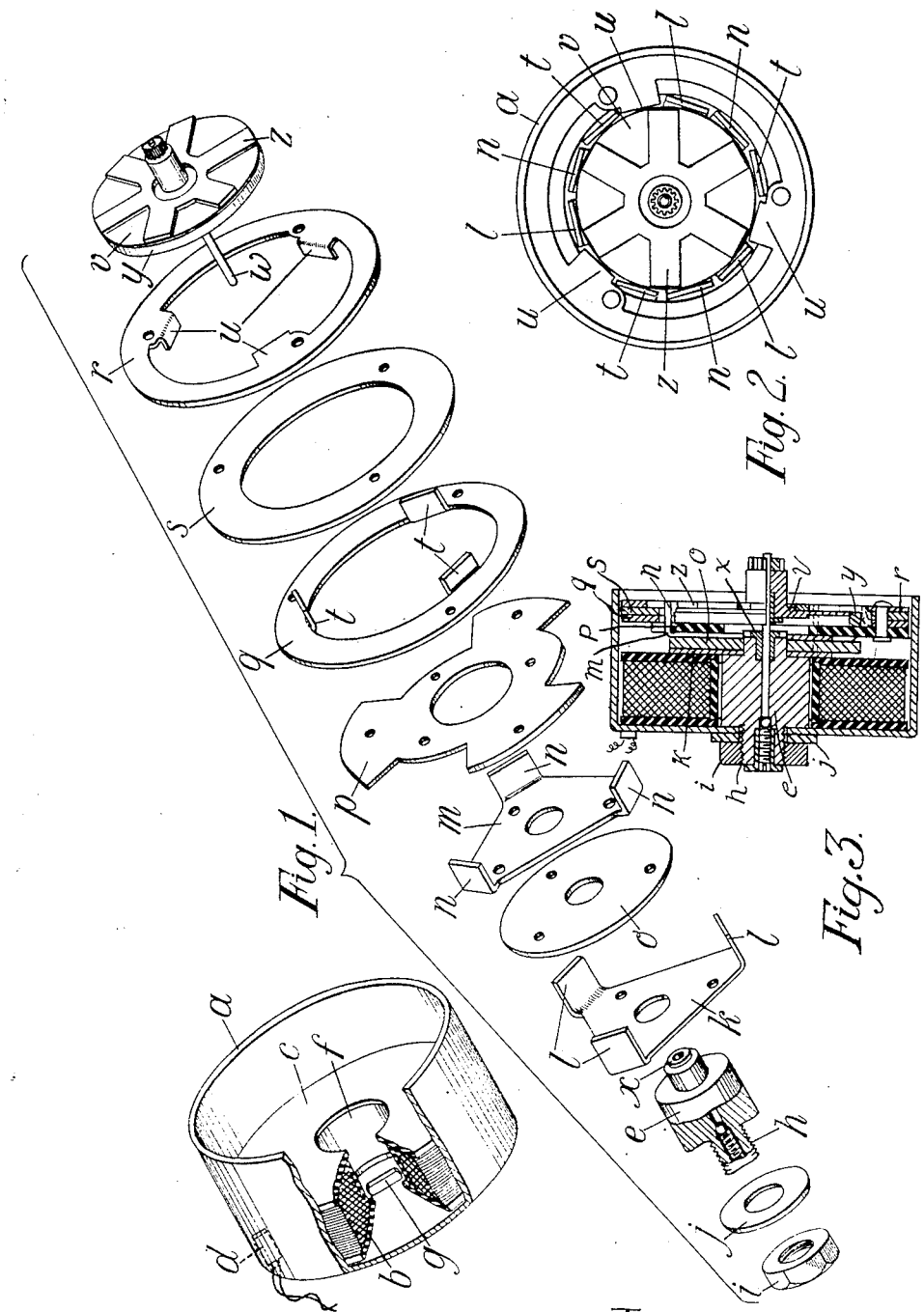
Inventor
A. H. Midgley Patented Dec. 2, 1952

2,620,450

UNITED STATES PATENT OFFICE 2,620,450

SYNCHRONOUS ELECTRIC MOTOR

Albert Henry Midgley, Northwood, England

Application December 7, 1949, Serial No. 131,572
In Great Britain December 13, 1948

3 Claims. (Cl. 310—164)

This invention relates to synchronous electric motors with particular reference to small motors of this kind such as are used in clocks, timing devices, meters and the like.

The object of the present invention is to devise improvements in the construction and arrangement of such motors which will result in obtaining a high starting and running torque in a motor of compact construction and very small over-all dimensions.

The invention consists in a self-starting synchronous electric motor of the shaded pole type having a hysteresis rotor ring and shading in the form of rings in which both shaded and unshaded poles together with the hysteresis rotor ring are symmetrical about the plane of at least one of the shading rings.

Further features of the invention will be apparent from the following description.

The drawing shows by way of example only one embodiment of the invention in which:

Figure 1 is an exploded view of the motor,

Figure 2 is an end view of the motor showing the arrangement of the pole pieces around the rotor, and Fig. 3 is a cross sectional view of the motor.

The motor is formed with a magnetic cup-shaped casing $a$ within which is housed the exciting coil $b$ upon an insulating bobbin $c$, the alternating current being fed to the coil through two leads which pass through the insulating block $d$ which is located in a slot in the back of the casing $a$ by which also the bobbin is prevented from rotating within the casing.

The stator comprises the magnetic core $e$ which passes through the centre $f$ of the bobbin and engages the back of the casing in a central slotted hole $g$, the screw threaded portion $h$ of the core $a$ having flats formed on either side to allow the passage of the member through the slotted hole $g$ and yet to receive the receiving nut $i$ and the washer $j$.

The magnetic starpiece $k$ which has three lugs or teeth $l$, which constitute pole-pieces which extend axially from the star, is secured to the end of or forms part of the core. A second and similar starpiece $m$ having lugs $n$ is fixed upon the end of the core, but separated from the first starpiece by the copper shading ring $o$. On top of this is placed a flat star $p$ of insulating material and the four latter members secured together by copper rivets passing through the holes shown, thus ensuring that they are all held rigidly in position. This assembly constitutes the one magnetic pole of the stator of one polarity, while the other pole of opposite polarity comprises the two rings $q$, $r$ of magnetic material separated by the copper annulus $s$ which is embraced by the pole-pieces $t$ and $u$ turned in opposite directions from the magnetic rings. These three latter parts are held together and co-axially with the pole-piece by copper rivets passing through the holes shown therein and the holes provided in the insulating star $p$. The sizes and positions of the pole-pieces on the stars and rings are such that they define a cylindrical recess in which the armature of the motor is located and is free to rotate.

The armature comprises an aluminium disc $v$ which is supported upon a spindle $w$ which is free to rotate in a bearing bush $x$ provided on the axis of the core $e$, a ball bearing being preferably provided at the further end of the bore, the ball being adjustable as to position by means of a screw threaded bolt in the end of the bore. On the lower side of the disc $v$ and around its periphery there is mounted a ring $y$ of permanent magnetic material such as tungsten or cast steel while upon the upper side of the disc $v$ there is mounted a starpiece $z$ of silicon iron or other soft magnetic material. The outer end of the spindle $w$ is provided with a pinion adapted to gear with the first wheel of a gear train.

The arrangement of the pole-pieces associated with two shading rings gives a heavy lag in the flux between the two sets of pole-pieces and this together with the large pole angle results in a high starting and running torque while at the same time the over-all dimensions may be kept within very small limits.

It will be understood that the foregoing details of construction are given purely by way of example to indicate the nature of the invention and not to limit its scope since obviously there are numerous ways in which the pole-pieces may be formed and associated with the two shading rings without departing from the scope of the invention.

For example, the pole-pieces instead of being axial as above described and shown in the figures may be positioned radial to the axis of the motor and be separated by shading rings arranged between them or one set may be arranged within the other or any other convenient disposition may be adopted.

I claim:

1. A self-starting synchronous electric motor comprising a cup-shaped magnetic casing, an energising coil fitting within the casing, a magnetic core for the coil, a pole structure fitting closely within the casing on top of the coil and core and including an inner unshaded pole member in contact with the core, a conducting ring over the inner unshaded pole, an inner shaded pole member in contact with the core over the conducting ring, a non-magnetic insulating member over the shaded pole member, an outer unshaded pole member in contact with the magnetic casing over the non-magnetic electrically non-conducting sheet, a second conducting ring over the outer unshaded pole member and an outer shaded pole member and the second conducting ring, and a rotatable armature cooperating with the poles of the pole structure.

2. A self-starting synchronous electric motor as claimed in claim 1, in which the inner pole members and first conducting rings are riveted together and to the non-magnetic insulating member and the outer pole members and second non-conducting rings are riveted together and to the non-magnetic electrically non-conducting member.

3. A self-starting synchronous electric motor as claimed in claim 1, in which pole-pieces of the two outer pole members are turned inwardly over the inner edge of the second conducting ring to embrace it.

ALBERT HENRY MIDGLEY.

REFERENCES CITED

The following references are of record in the file of this patent:

UNITED STATES PATENTS

| Number | Name | Date |
|---|---|---|
| 1,933,440 | Kurz | Oct. 31, 1933 |
| 1,933,591 | Holtz et al. | Nov. 7, 1933 |
| 1,957,275 | Lenehan | May 1, 1934 |
| 2,080,371 | Hammond | May 11, 1937 |
| 2,140,365 | Lenehan | Dec. 13, 1938 |
| 2,292,265 | Carpenter | Aug. 4, 1942 |
| 2,455,134 | Mungall | Nov. 30, 1948 |
| 2,460,358 | Packard | Feb. 1, 1949 |
| 2,531,518 | Kuhlmann | Nov. 28, 1950 |
| 2,537,093 | Schlenker | Jan. 9, 1951 |
| 2,583,180 | Kronmiller et al. | Jan. 22, 1952 |

FOREIGN PATENTS

| Number | Country | Date |
|---|---|---|
| 493,928 | Great Britain | Jan. 11, 1937 |